United States Patent
Wang

(10) Patent No.: US 10,484,274 B2
(45) Date of Patent: Nov. 19, 2019

(54) CONTROLLING PACKETS OF VIRTUAL MACHINES

(71) Applicant: NEW H3C TECHNOLOGIES CO., LTD, Hangzhou, Zhejiang (CN)

(72) Inventor: Weifeng Wang, Beijing (CN)

(73) Assignee: NEW H3C TECHNOLOGIES CO., LTD, Hangzhou (CN)

( * ) Notice: Subject to any disclaimer, the term of this patent is extended or adjusted under 35 U.S.C. 154(b) by 0 days.

(21) Appl. No.: 16/066,398

(22) PCT Filed: Dec. 26, 2016

(86) PCT No.: PCT/CN2016/112039
§ 371 (c)(1),
(2) Date: Jun. 27, 2018

(87) PCT Pub. No.: WO2017/114342
PCT Pub. Date: Jul. 6, 2017

(65) Prior Publication Data
US 2019/0268262 A1  Aug. 29, 2019

(30) Foreign Application Priority Data

Dec. 31, 2015 (CN) .......................... 2015 1 1028426

(51) Int. Cl.
*H04L 12/721* (2013.01)
*H04L 12/715* (2013.01)
(Continued)

(52) U.S. Cl.
CPC .......... *H04L 45/38* (2013.01); *G06F 9/45558* (2013.01); *H04L 12/4641* (2013.01);
(Continued)

(58) Field of Classification Search
None
See application file for complete search history.

(56) References Cited

U.S. PATENT DOCUMENTS

2016/0057014 A1* 2/2016 Thakkar .............. G06F 9/45558
                                                       709/223
2016/0197779 A1  7/2016 Soejima
(Continued)

FOREIGN PATENT DOCUMENTS

CN    103763146 A    4/2014
CN    103825954 A    5/2014
(Continued)

OTHER PUBLICATIONS

Matsumoto, Atsushi, et al., "Implementation to optimize inter-VM traffic in cloud environment—Rewrite flow-entries for each tenant in OVS to existing Clouds—," IEICE Technical Report CS2014-11 (Apr. 24-25, 2014).

*Primary Examiner* — Christine T Duong
(74) *Attorney, Agent, or Firm* — McCarter & English, LLP; Kia L. Freeman; Thomas F. Foley

(57) ABSTRACT

Examples of the present disclosure provide a VM packet controlling method and apparatus, applicable for an OpenStack network. The OpenStack network includes an OpenStack controller node, an OpenStack compute node, and a virtual network system. The OpenStack network is communicatively connected with an SDN controller, the virtual network system includes a VM and a virtual network apparatus responsible for forwarding packets of the virtual machine. The OpenStack controller node creates a port for the VM, informs the SDN controller of a port UUID and a forwarding rule applied on the port; the OpenStack controller node receives a port ID, and transmits a corresponding relationship between the port ID and the port UUID to the SDN controller, the SDN controller generates a flow table according to the forwarding rule applied on the port, and issues the flow table to the virtual network apparatus according to the corresponding relationship.

13 Claims, 6 Drawing Sheets

(51) Int. Cl.
*H04L 12/46* (2006.01)
*H04L 12/741* (2013.01)
*H04L 12/931* (2013.01)
*G06F 9/455* (2018.01)

(52) U.S. Cl.
CPC .............. *H04L 45/64* (2013.01); *H04L 45/66* (2013.01); *H04L 45/74* (2013.01); *H04L 49/70* (2013.01); *G06F 2009/45595* (2013.01)

(56) References Cited

U.S. PATENT DOCUMENTS

2016/0373345 A1    12/2016    Li et al.
2017/0078114 A1    3/2017    Mibu
2017/0180213 A1*    6/2017    Li ........................... H04L 29/08
2018/0341509 A1*    11/2018    DeSanti .............. G06F 9/45558

FOREIGN PATENT DOCUMENTS

| CN | 104301238 A | 1/2015 |
| CN | 104639372 A | 5/2015 |
| CN | 104954281 A | 9/2015 |
| EP | 3128705 A1 | 2/2017 |
| WO | 2013/184225 A1 | 12/2013 |
| WO | 2015040788 A1 | 3/2015 |
| WO | 2015133327 A1 | 9/2015 |

* cited by examiner

CONTROLLING PACKETS OF VIRTUAL MACHINES

RELATED APPLICATIONS

This application is a 35 U.S.C. § 371 national stage filing of International Application No. PCT/CN2016/112039, filed on Dec. 26, 2016, which claims priority of Chinese Patent Application No. 201511028426.9, filed on Dec. 31, 2015. The entire contents of each of the foregoing applications are incorporated herein by reference.

BACKGROUND

OpenStack is an open-source management platform project for cloud computing, supporting almost all types of cloud environments. The OpenStack is deployed as an infrastructure as a service (IaaS) solution via various kinds of complementary services. Each service provides an application programming interface (API) so as to be integrated together.

A standard OpenStack network generally includes a controller node, a network node and a compute node. The controller node is a main part of the OpenStack network, and manages the network node and the compute node. The controller node controls the compute node to create, start and shut down a virtual machine. The virtual machine created by the compute node visits an external network via the network node. Virtual machines located on different compute nodes also communicate with each other via the network node.

DETAILED DESCRIPTION

The preset disclosure will be described in further detail hereinafter with reference to accompanying drawings and examples to make the technical solution and merits therein clearer.

In OpenStack network, since packets of a virtual machine (VM) do not pass through a compute node when being forwarded, the compute node cannot filter the packets of the virtual machine and thus cannot implement forwarding control to the packets of the virtual machine.

In some examples of the present disclosure, a software defined network (SDN) controller is introduced to the OpenStack network. An OpenStack controller node creates a port for a VM, informs the SDN controller of a port universally unique identifier (UUID) of the port created for the VM and a forwarding rule applied on the port. After the VM is created in a virtual network system, the OpenStack controller node receives a port ID of the port of the VM retrieved by an OpenStack compute node. The OpenStack controller node transmits a corresponding relationship between the port ID and the port UUID of the VM to the SDN controller. The SDN controller generates a flow table according to the forwarding rule applied on the port, and issues the flow table to a virtual network apparatus according to the corresponding relationship. The virtual network apparatus forwards packets of the VM according to the flow table. Thus, the forwarding control of the packets of the VM is realized.

The SDN is a new type of network communication architecture. The SDN technique realizes centralized control and distributed forwarding for network devices. In the SDN technique, network functions are divided into two parts: SDN controller and forwarding devices. The two parts communicate via a secure channel. The SDN controller may have a centralized management to the network devices controlled, provide a uniform organization to network behaviors, and define forwarding behaviors of the forwarding devices. The SDN technique greatly improves the controllability and flexibility of the network management.

Figure 1:
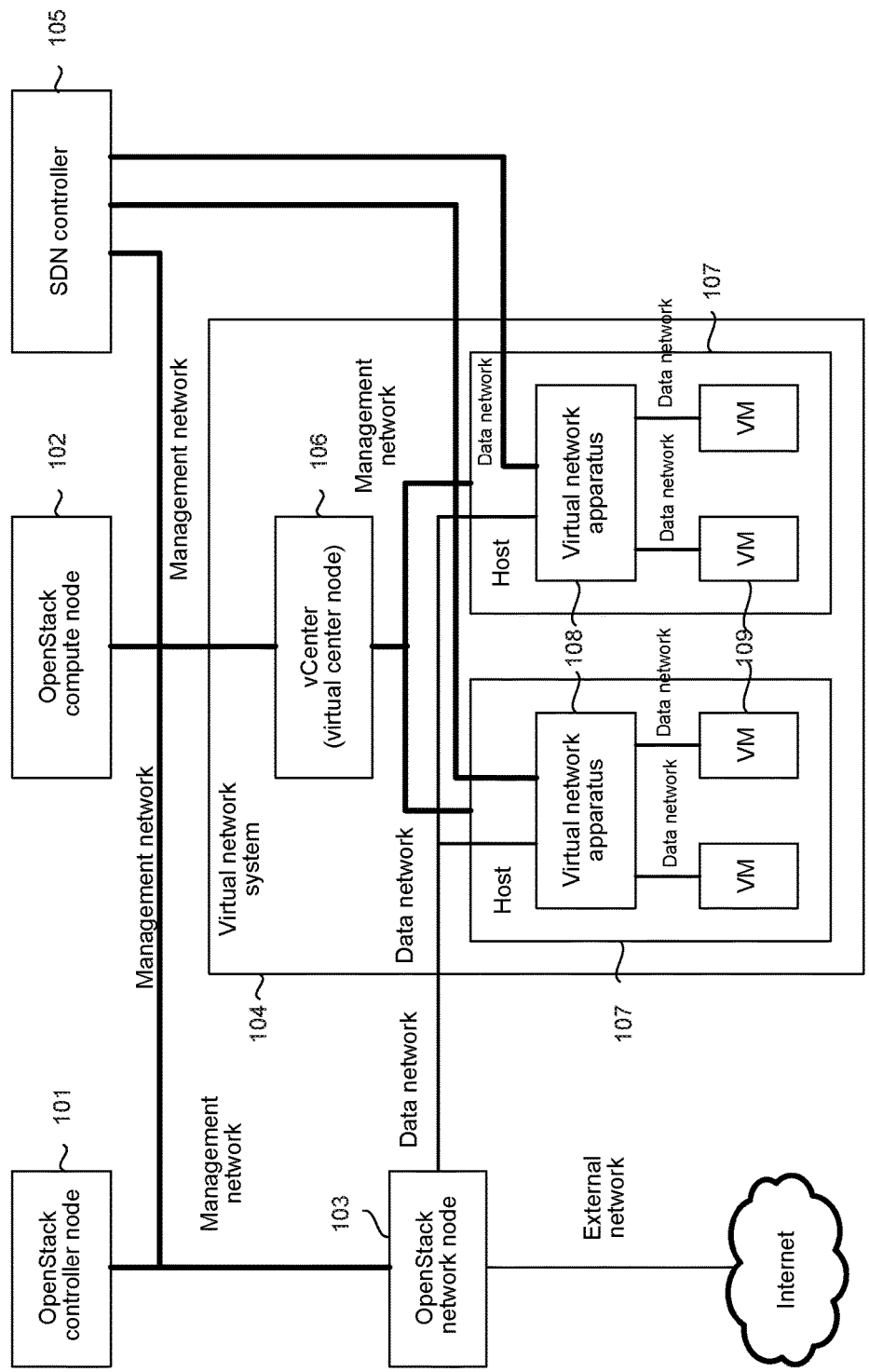
FIG. 1 is a schematic diagram illustrating a network topology according to some examples of the present disclosure.

FIG. 1 is a schematic diagram illustrating a network topology according to some examples of the present disclosure. As shown in FIG. 1, the network includes an OpenStack controller node 101, an OpenStack compute node 102, an OpenStack network node 103, a virtual network system 104 and an SDN controller 105.

The virtual network system 104 includes a virtual network center (vCenter) 106, a host 107 virtualized in the virtual network system, a virtual network apparatus 108 and a VM 109. The virtual network apparatus 108 may be a virtual switch (vSwitch) or a virtual router, used for forwarding packets of the VM 109.

The OpenStack controller node 101, the OpenStack compute node 102 and the OpenStack network node 103 are coupled to each other via a management network; the SDN controller 105 and the virtual network apparatus 108 are coupled to each other. The virtual network apparatus 108 and the OpenStack network node 103 are coupled to each other. The OpenStack network node 103 communicates with Internet via an external network.

As shown in FIG. 1, the OpenStack controller node 101 creates a port for a VM, and informs the SDN controller 105 of a port UUID of the port created for the VM and a forwarding rule applied on the port. After the VM is created in the virtual network system 104, the OpenStack controller node 101 receives a port ID of the port of the VM retrieved by the OpenStack compute node 102. The OpenStack controller node 101 transmits a corresponding relationship between the port ID and the port UUID of the VM to the SDN controller 105. The SDN controller 105 generates a flow table according to the forwarding rule of the port, and issues the flow table to the virtual network apparatus 104 according to the corresponding relationship. The virtual network apparatus 104 forwards packets of the VM according to the flow table. As such, forwarding control of the packets of the VM is realized.

In some examples, the virtual network apparatus and the SDN controller may communicate with each other based on an OpenFlow protocol. At this time, the virtual network apparatus may be a virtual switch supporting the OpenFlow protocol or a virtual router supporting the OpenFlow protocol.

The switch supporting the OpenFlow protocol may be referred to as an OpenFlow switch. Each OpenFlow switch has a flow table used for packet searching and forwarding. The OpenFlow switch may be connected with an external SDN controller via a secure channel according to the OpenFlow protocol, to search and manage the flow table.

The flow table includes header fields, active counters and zero or multiple actions. A searching operation is performed with respect to each packet. If match, a corresponding rule is executed, otherwise, the packet is transmitted to the SDN controller via the secure channel and the SDN controller determines an action to be performed for the packet.

The header fields include 12 fields, as shown in Table 1, including ingress port, Ether Src, Ether Dst, Ether Type, Vlan id, Vlan Priority, IP src, IP dst, Protocol, IP ToS, TCP/UDP Src Port, TCP/UDP dst Port. Each field includes a specific value or any value. A more accurate matching may be implemented via mask.

TABLE 1

| Flow table structure | | | | | | | | | | | |
|---|---|---|---|---|---|---|---|---|---|---|---|
| Ingress Port | Ether src | Ether dst | Ether Type | Vlan id | Vlan Priority | IP src | IP dst | protocol | IP ToS bits | TCP/UDP src Port | TCP/UDP dst Port |

The active counter may be maintained with respect to respective table, flow, port and queue, to collect information about traffic, e.g., active table, number of searching times, number of transmitted packets, etc.

Each entry corresponds to zero or a plurality of actions. If there is no forwarding action, it is discarded in default. The plurality of actions needs to be executed according to priorities. But the transmission sequence of the packets is not ensured. In addition, the switch may return an unsupported flow error for an unsupported action.

In some examples, a hypervisor is running in the virtual network system to monitor resources of the virtual network system. The OpenStack compute node has to support this type of hypervisor.

Figure 2:
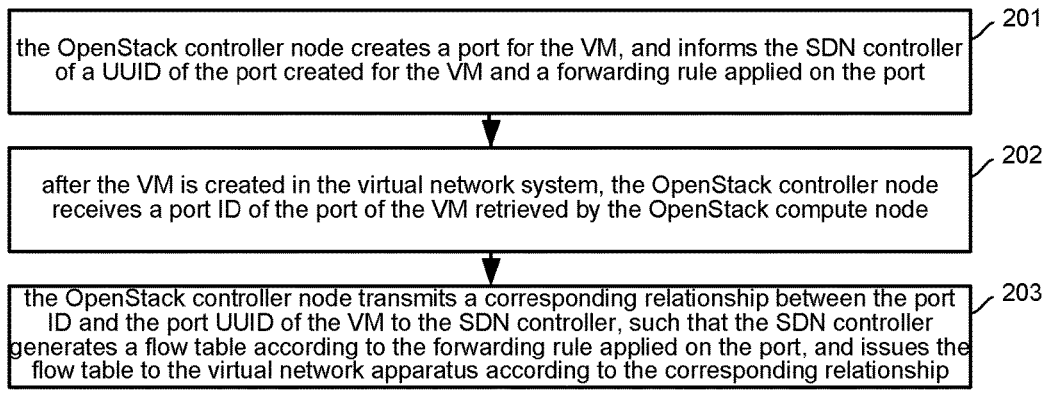
FIG. 2 is a flowchart illustrating a VM packet controlling method applicable for an OpenStack network according to some examples of the present disclosure.

Some examples of the present disclosure provide a VM packet controlling method, applicable for an OpenStack network. The OpenStack network includes an OpenStack controller node, an OpenStack compute node, and a virtual network system; the OpenStack network is communicatively connected with a SDN controller, the virtual network system includes a VM and a virtual network apparatus responsible for forwarding packets of the VM. As shown in FIG. 2, the method includes the following.

In block 201, the OpenStack controller node creates a port for the VM, and informs the SDN controller of a UUID of the port created for the VM and a forwarding rule applied on the port.

The forwarding rule may be a security group rule in the OpenStack technique. In the OpenStack technique, a security group and the security group rule are configured for the port of the VM. Each security group may be configured with a plurality of security group rules. Each security group is configured with one unique identifier, referred to as a security group identifier.

Alternatively, the forwarding rule may also be service chain information. In the OpenStack technique, a service chain and service chain information may be configured. The service chain refers to multiple service nodes that a packet passes by when being forwarded. The service chain information includes relevant information (e.g., Quintet form information) of each service node, and each service chain is identified by its service chain identifier.

In block 202, after the VM is created in the virtual network system, the OpenStack controller node receives a port ID of the port of the VM retrieved by the OpenStack compute node.

The port ID of the VM is allocated by the virtual network system according to a configured port group. Multiple port groups are configured in the virtual network system. After the VM is created, the vCenter selects one port ID from the configured port groups for the VM. The OpenStack compute node inquiries about the port ID of the VM from the virtual network system, and provides the obtained port ID of the VM to the OpenStack controller node.

In block 203, the OpenStack controller node transmits a corresponding relationship between the port ID and the port UUID of the VM to the SDN controller, such that the SDN controller generates a flow table according to the forwarding rule applied on the port, and issues the flow table to the virtual network apparatus according to the corresponding relationship.

After the OpenStack compute node retrieves the port ID, the OpenStack controller node obtains the retrieved port ID and informs the SDN controller. At this time, the OpenStack controller node may inform the SDN controller of the corresponding relationship between the port ID and the port UUID of the VM via a port update message of the OpenStack protocol. Thus, the current OpenStack protocol is unchanged and no new message type is added to the OpenStack protocol. In particular, the port update message includes a port name field, the port ID may be written in the port name filed of the port update message, and the port update message carries the port UUID. Thus, the SDN controller is able to obtain the port ID and the port UUID at the same time from the port update message, and records a corresponding relationship between them.

Figure 3:
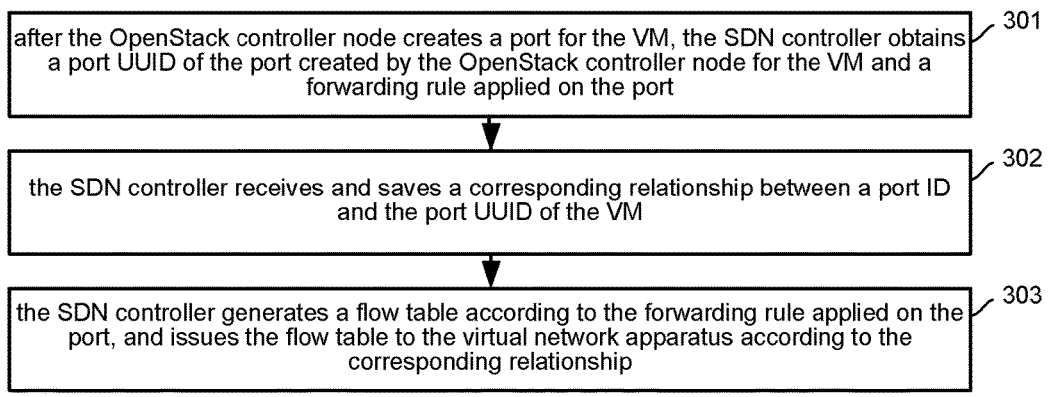
FIG. 3 is a flowchart illustrating a VM packet controlling method applicable for an SDN controller according to some examples of the present disclosure.

Accordingly, examples of the present disclosure further provide a VM packet controlling method, applicable for an SDN controller. The SDN controller is communicatively connected with an OpenStack network; the OpenStack network includes an OpenStack controller node, an OpenStack compute node and a virtual network system; the virtual network system includes a VM and a virtual network apparatus responsible for forwarding packets of the VM. As shown in FIG. 3, the method includes the following.

In block 301, after the OpenStack controller node creates a port for the VM, the SDN controller obtains a port UUID of the port created by the OpenStack controller node for the VM and a forwarding rule applied on the port.

In some examples, before block 301, the method may further include: the SDN controller receives a forwarding group and a forwarding rule from the OpenStack controller node, wherein each forwarding group has a unique forwarding group identifier.

At this time, the process of the SDN controller obtaining the port UUID of the port created by the OpenStack controller node for the VM and the forwarding rule applied on the port in block 301 includes:

the SDN controller receiving the port UUID of the VM and the forwarding group identifier of the forwarding group applied on the port of the VM from the OpenStack controller node, and establishing a corresponding relationship between the port UUID of the VM and the forwarding group identifier.

In block 302, the SDN controller receives and saves a corresponding relationship between a port ID and the port UUID of the VM.

In some examples, block 302 may include: the SDN controller receives a port update message from the OpenStack controller node, the SDN controller parses the port update message and obtains the port UUID and the port ID of the VM carried in a port name; the SDN controller saves the corresponding relationship between the port UUID and the port ID of the VM.

In block 303, the SDN controller generates a flow table according to the forwarding rule applied on the port, and issues the flow table to the virtual network apparatus according to the corresponding relationship between the port UUID and the port ID of the VM.

In some examples, block 303 may include: the SDN controller determines the forwarding rule included in the forwarding group applied on the port of the VM according to the forwarding group identifier, the SDN controller generates the flow table according to the determined forwarding rule; and the SDN controller issues the flow table to the corresponding virtual network apparatus according to the corresponding relationship of block 302.

In the VM packet controlling method provided by examples of the present disclosure, in the network containing the OpenStack network and the virtual network system, the SDN controller generates a flow table according to a configured forwarding rule, and issues the flow table to the corresponding virtual network apparatus according to the corresponding relationship between the ID and the port UUID of the VM. Thus, the forwarding control to the packets not passing through the OpenStack compute node in the virtual network system is realized.

Figure 4:
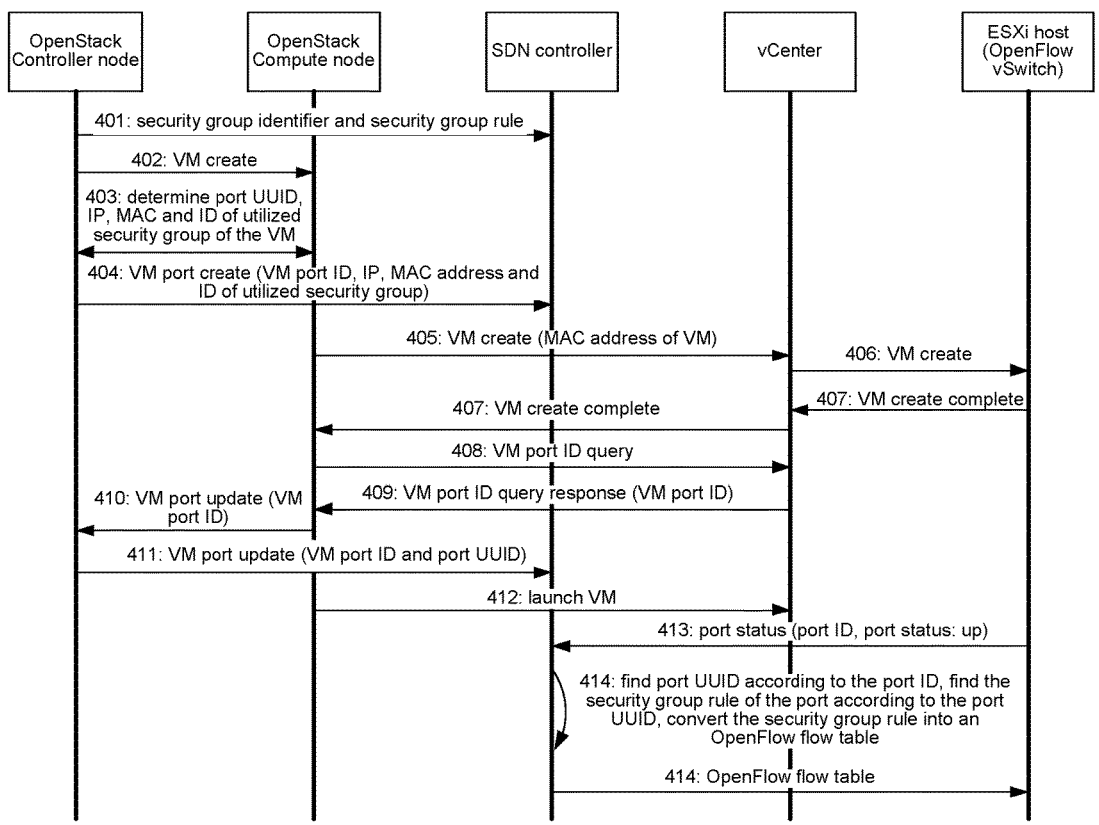
FIG. 4 shows a message flow for a VM packet controlling process in case that a compute node supports a VMware vSphere type hypervisor according to some examples of the present disclosure.

FIG. 4 is a flowchart illustrating a VM packet controlling process in case that a compute node supports VMware vSphere type hypervisor according to some examples of the present disclosure. In some examples, assume that the OpenStack compute node supports the VMware vSphere type hypervisor, the host is an ESXi host. The method as shown in FIG. 4 may include the following.

In block 400, an SDN controller is configured, an Open-Flow switch (vSwitch) is configured in an ESXi host of the VMware vSphere to replace a virtual switch of the VMware vSphere.

The SDN controller is an independent node, independent from the OpenStack and the VMware vSphere.

In block 401, the OpenStack controller node transmits an ID of each security group configured by the OpenStack controller node and a rule of each security group to the SDN controller.

In block 402, the OpenStack controller node transmits a VM create message to the OpenStack compute node carrying information about the VM to be created, such as CPU, memory of the VM, etc.

In block 403, the OpenStack compute node receives the VM create message transmitted by the OpenStack controller node, interacts with the OpenStack controller node to determine a port UUID, a port IP address, and a port MAC address, and an ID of the security group for the port of the VM to be created.

In block 404, the OpenStack controller node transmits a VM port create message to the SDN controller, carrying the port UUID, the port IP address, the port MAC address, the ID of the security group, etc. of the VM to be created, the SDN controller saves the port UUID, the port IP address, the port MAC address, the ID of the security group for the port of the VM carried in the port create message.

In block 405, the OpenStack compute node transmits a VM create message to the vCenter of the VMware vSphere, carrying the information of the VM to be created and the port MAC address, etc.

In block 406, the vCenter receives the VM create message, forwards the message to the ESXi host, the ESXi host allocates corresponding resources for the VM according to the information of the VM to be created, and the vCenter adds the port of the VM to the port group, and allocates a port ID for the port of the VM.

In block 407, the vCenter receives a VM create complete message from the ESXi host, and forwards the message to the OpenStack compute node.

In block 408, the OpenStack compute node receives the VM create complete message from the vCenter, and transmits a VM port ID query message to the vCenter.

In block 409, the vCenter receives the VM port ID query message, returns a VM port ID query response message carrying the port ID of the VM to the OpenStack compute node.

In block 410, the OpenStack compute node receives the VM port ID query response message, and transmits the port ID to the OpenStack controller node via a VM port update message.

In block 411, the OpenStack controller node receives the VM port update message, transmits a VM port update message carrying the port UUID and the port ID of the VM to the SDN controller; the SDN controller receives the VM port update message, and saves a corresponding relationship between the port UUID and the port ID of the VM.

In block 412, the OpenStack compute node notifies the vCenter to start the VM.

In block 413, the vSwitch transmits a port status message to the SDN controller after the VM is started, carrying the port ID and the port status: up.

In block 414, the SDN controller receives the port status message, finds the corresponding port UUID according to the port ID in the message, and finds the security group ID of the port according to the port UUID, converts the security group rule into an OpenFlow table according to the security group rule corresponding to the security group ID, and issues the converted OpenFlow table to the vSwitch.

Figure 5:
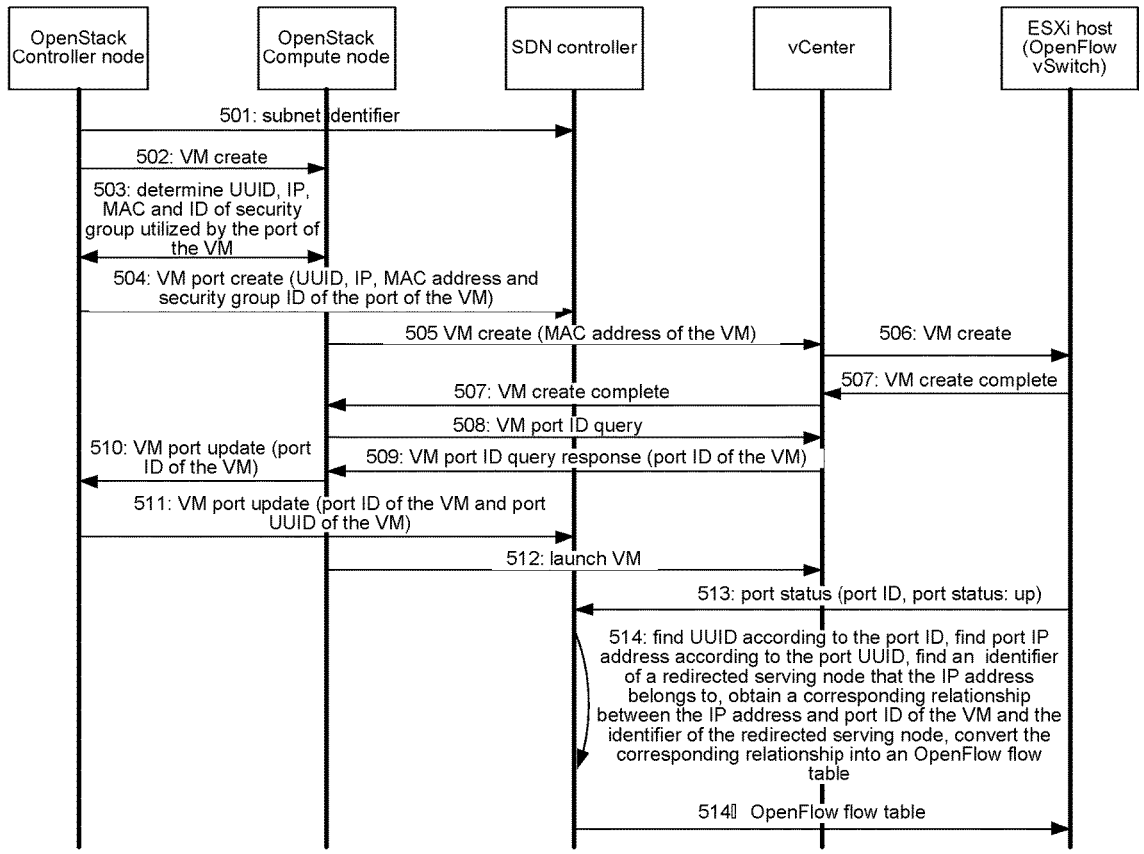
FIG. 5 shows a message flow for a VM packet controlling process in case that the compute node supports the VMware vSphere type hypervisor according to some examples of the present disclosure.

FIG. 5 is a flowchart illustrating a VM packet controlling process in case that the compute node supports the VMware vSphere type hypervisor according to some examples of the present disclosure. The method includes the following.

In block 500, an SDN controller is configured, an Open-Flow switch (vSwitch) is configured in an ESXi host of the VMware vSphere to replace a virtual switch of the VMware vSphere.

The SDN controller is an independent node, independent from the OpenStack and the VMware vSphere.

In block 501, the OpenStack controller node transmits a subnet identifier configured by the OpenStack controller node to the SDN controller, the SDN controller saves a corresponding relationship between the subnet identifier configured by a manager and an identifier of a redirected service node.

In block 502, the OpenStack controller node transmits a VM create message to the OpenStack compute node, carrying information about the VM to be created, such as: CPU, memory, etc.

In block 503, the OpenStack compute node receives the VM create message transmitted by the OpenStack controller node, interacts with the OpenStack controller node to determine information of the VM to be created such as a port UUID, a port IP address, a port MAC address, etc.

In block 504, the OpenStack controller node transmits a VM port create message to the SDN controller carrying the port UUID, the port IP address, the port MAC address, etc. of the VM to be created, the SDN controller saves the port UUID, the port IP address, the port MAC address, etc. carried in the VM port crate message.

In block 505, the OpenStack compute node transmits a VM create message to the vCenter of the VMware vSphere, carrying the information of the VM to be created and the port MAC address, etc.

In block 506, the vCenter receives the VM create message, forwards the message to the ESXi host, the ESXi host allocates corresponding resources for the VM according to the information of the VM to be created, and the vCenter adds the port of the VM to the port group, and allocates a port ID for the port of the VM.

In block 507, the vCenter receives a VM create complete message transmitted by the ESXi host, and forwards the message to the OpenStack compute node.

In block 508, the OpenStack compute node receives the VM create complete message from the vCenter, and transmits a VM port ID query message to the vCenter.

In block 509, the vCenter receives the VM port ID query message, returns a VM port ID query response message carrying the port ID of the VM to the OpenStack compute node.

In block 510, the OpenStack compute node receives the VM port ID query response message, and transmits the port ID to the OpenStack controller node via a VM port update message.

In block 511, the OpenStack controller node receives the VM port update message, transmits a VM port update message carrying the port UUID and the port ID of the VM to the SDN controller; the SDN controller receives the VM port update message, and saves a corresponding relationship between the port UUID and the port ID of the VM.

In block 512, the OpenStack compute node informs the vCenter to start the VM.

In block 513, the vSwitch transmits a port status message to the SDN controller after the VM is started, carrying the port ID and the port status: up.

In block 514, the SDN controller receives the port status message, finds the corresponding port UUID according to the port ID in the message, finds the port IP address according to the port UUID, finds the identifier of the redirected service node of the subnet where the IP address belongs to according to the port IP address, obtains a corresponding relationship between the IP address and the port ID of the VM and the identifier of the redirected service node, converts the corresponding relationship into an OpenFlow table, and issues the openflow table to the vSwitch.

According to the solution provided by examples of the present disclosure, the OpenStack controller node transmits a port UUID of the VM to the SDN controller after creating a port for the VM. The OpenStack compute node queries the port ID of the VM from the virtual center node after the VM is created and returns the port ID to the OpenStack controller node. The OpenStack controller node transmits the corresponding relationship between the port ID and the port UUID of the VM to the SDN controller. The SDN controller generates the flow table according to the forwarding rule applied on the port, and issues the flow table to the virtual network apparatus according to the corresponding relationship. Thus, forwarding control of the packets of the VM is realized.

Figure 6:
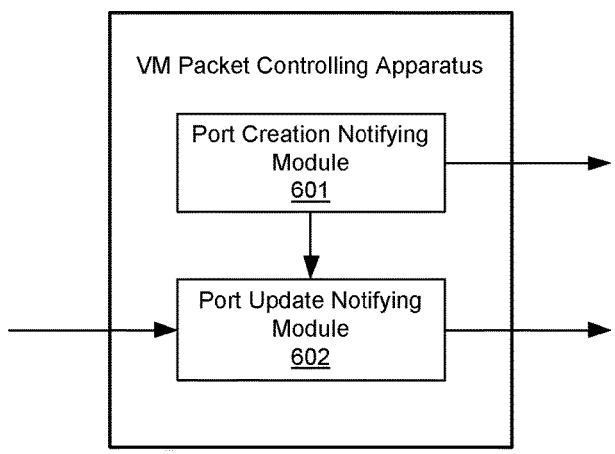
FIG. 6 is a schematic diagram illustrating a VM packet controlling apparatus located in an OpenStack network according to some examples of the present disclosure.

FIG. 6 is a schematic diagram illustrating a VM packet controlling apparatus configured in an OpenStack controller node of an OpenStack network according to some examples of the present disclosure. The OpenStack network includes the OpenStack controller node, an OpenStack compute node and a virtual network system; the OpenStack controller node is communicatively connected with an SDN controller, the virtual network system includes a VM, and a virtual network apparatus responsible for forwarding packets of the VM. The apparatus includes a port creation notifying module 601 and a port update notifying module 602; wherein The port creation notifying module 601 is to create a port for the VM, notifies the SDN controller of a port UUID of the VM and a forwarding rule applied on the port, and notifies the port update notifying module 602 of the port UUID of the VM.

The port update notifying module 602 is to receive, after the OpenStack controller node creates the VM in the virtual network system, a port ID of the VM retrieved by the OpenStack compute node, wherein the port ID of the VM is allocated by the virtual network system according to a configured port group; transmit a corresponding relationship between the port ID and the port UUID of the VM to the SDN controller, wherein the SDN controller generates a flow table according to the forwarding rule applied on the port, and issues the flow table to the virtual network apparatus according to the corresponding relationship.

In some examples, in order to transmit the corresponding relationship between the port ID and the port UUID of the VM to the SDN controller, the port update notifying module 602 is further to:

generate a port update message, wherein the port update message includes the port ID acting as a port name of the VM, and the port UUID corresponding to the port ID; and transmit the port update message to the SDN controller.

In some examples of the present disclosure, the port creation notifying module 601 is further to transmit the configured forwarding group and the forwarding rule to the SDN controller before creating the port for the VM, wherein each forwarding group has a unique identifier;

in order to notify the SDN controller of the port UUID for the VM and the forwarding rule applied on the port, the port creation notifying module 601 is further to:

notify the SDN controller of the port UUID for the VM and a forwarding group identifier of the forwarding group configured for the port of the VM.

In some examples of the present disclosure, the forwarding group is a security group, the forwarding rule is a security group rule, and the forwarding group identifier is a security group identifier;

or, the forwarding group is a service chain, the forwarding rule is service chain information, and the forwarding group identifier is a service chain identifier.

Figure 7:
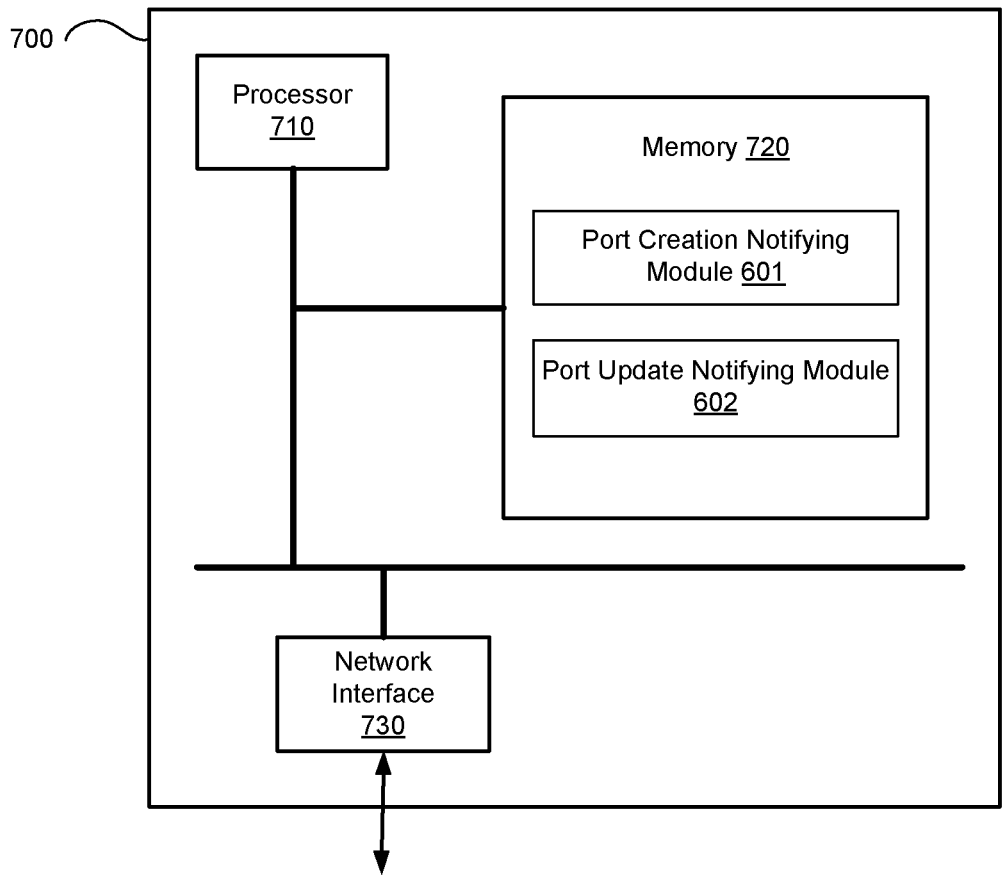
FIG. 7 is a schematic diagram illustrating another VM packet controlling apparatus located in the OpenStack network according to some examples of the present disclosure.

FIG. 7 is a schematic diagram illustrating another VM packet controlling apparatus configured in the OpenStack controller node of an OpenStack network according to some examples of the present disclosure. As shown in FIG. 7, the apparatus 700 includes a processor 710, a memory 702, and a network interface 730.

The memory 720 stores machine readable instructions. The processor 710 may execute the machine readable instructions stored in the memory 720 to implement the functions of the port creation notifying module 601 and the port update notifying module 602. The detailed functions and operations have been described above with reference to some examples and are not repeated herein.

The network interface 730 is to implement the communication between the apparatus 700 and the SDN controller and the OpenStack compute node.

Figure 8:
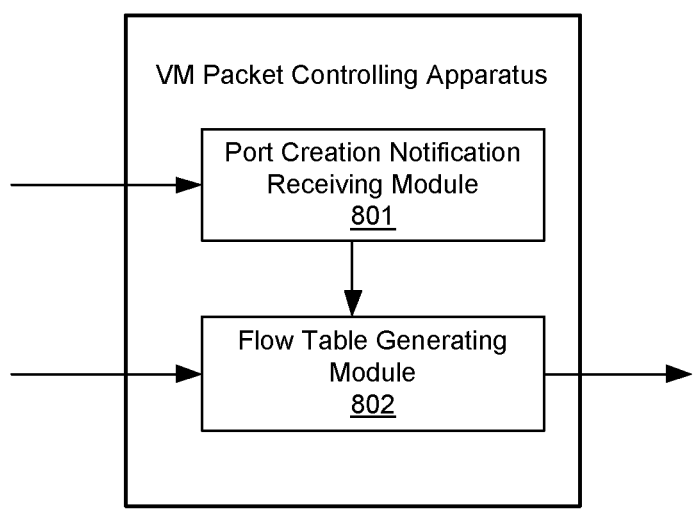
FIG. 8 is a schematic diagram illustrating a VM packet controlling apparatus located in an SDN controller according to some examples of the present disclosure.

FIG. 8 is a schematic diagram illustrating a VM packet controlling apparatus configured in an SDN controller according to some examples of the present disclosure. The SDN controller is communicatively connected with an OpenStack network, the OpenStack network includes an OpenStack controller node, an OpenStack compute node and a virtual network system; the virtual network system includes a virtual machine, and a SDN virtual network apparatus responsible for forwarding packets of the VM. The apparatus includes:

a port creation notification receiving module 801, to obtain after the OpenStack controller node creates a port of a VM, a port UUID of the VM created by the OpenStack controller node and a forwarding rule applied on the port;

a flow table generating module 802, to receive a corresponding relationship between a port ID and the port UUID of the VM from the OpenStack controller node and save the corresponding relationship, wherein the OpenStack controller node receives from the OpenStack compute node the port ID of the VM retrieved by the OpenStack compute node, the port ID of the VM is allocated by the virtual network system according to a configured port group, generate a flow table according to the forwarding rule applied on the port obtained by the port creation notification receiving module 801, and issues the flow table to the virtual network apparatus according to the corresponding relationship.

In some examples of the present disclosure, in order to receive and save the corresponding relationship between the port ID and the port UUID of the VM, the flow table generating module 802 is further to:

receive a port update message from the OpenStack controller node, parse the port update message, obtain the port UUID and the port ID of the VM carried in the port name, and save the corresponding relationship between the port UUID and the port ID of the VM.

In some examples of the present disclosure, the port creation notification receiving module 801 is further to receive a forwarding group and a forwarding rule transmitted by the OpenStack controller node before obtaining the port UUID of the VM created by the OpenStack controller node and the forwarding rule applied on the port; wherein each forwarding group has a unique identifier;

in order to obtain the port UUID of the VM created by the OpenStack controller node and the forwarding rule applied on the port, the port creation notification receiving module 801 is further to:

receive the port UUID of the VM and a forwarding group identifier of the forwarding group applied on the port of the VM transmitted by the OpenStack controller node, and create a corresponding relationship between the port UUID of the VM and the forwarding group identifier of the forwarding group applied on the port of the VM;

in order to generate the flow table according to the forwarding rule applied on the port and issue the flow table to the corresponding virtual network apparatus according to the corresponding relationship, the flow table generating module 802 is further to:

determining the forwarding rule included in the forwarding group applied on the port of the VM according to the forwarding group identifier; and issue the flow table to the corresponding virtual network apparatus according to the corresponding relationship.

In some examples of the present disclosure, the forwarding group is a security group, the forwarding rule is a security group rule, and the forwarding group identifier is a security group identifier;

or, the forwarding group is a service chain, the forwarding rule is service chain information, and the forwarding group identifier is service chain identifier.

Figure 9:
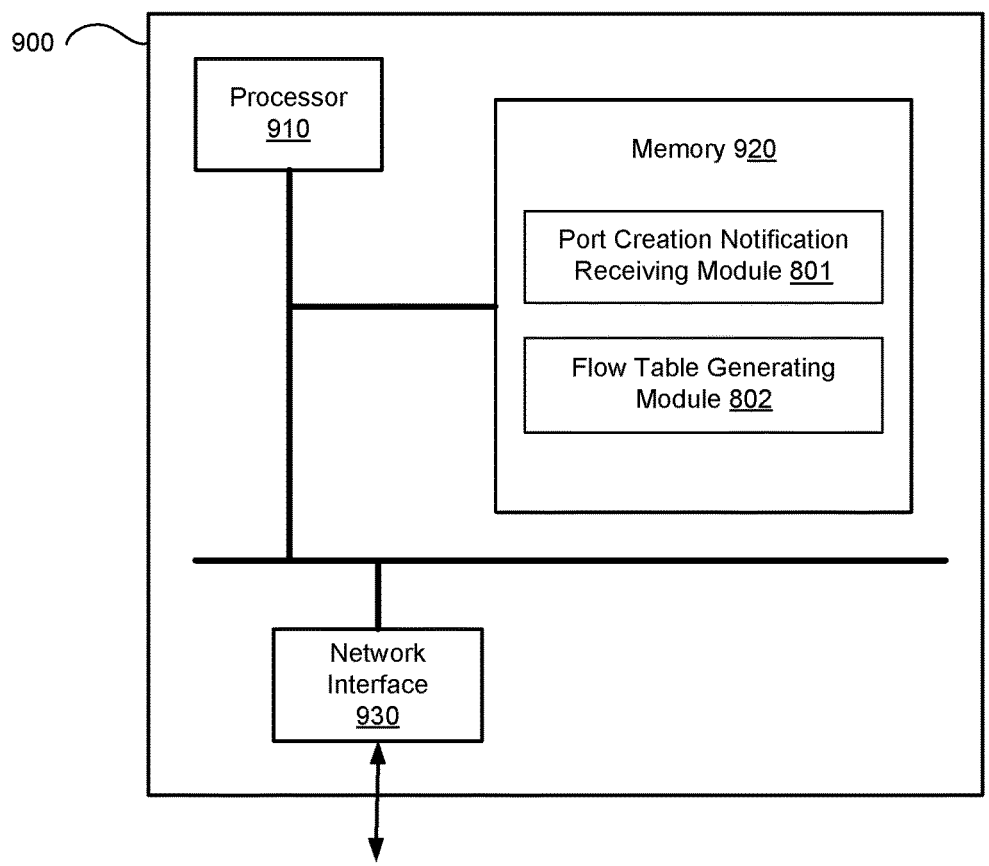
FIG. 9 is a schematic diagram illustrating another VM packet controlling apparatus located in the SDN controller according to some examples of the present disclosure.

FIG. 9 is a schematic diagram illustrating another VM packet controlling apparatus configured in an OpenStack controller node of an OpenStack network according to some examples of the present disclosure. As shown in FIG. 9, the apparatus 900 includes a processor 910, a memory 920, and a network interface 930.

The memory 920 stores machine readable instructions. The processor 910 may execute the machine readable instructions stored in the memory 920 to implement the functions of the port creation notification receiving module 801 and the flow table generating module 802. The detailed functions and operations have been described above with reference to some examples and are not repeated herein.

The network interface 930 is to implement the communication between the SDN controller and the OpenStack controller node and the virtual network apparatus.

In various examples of the present disclosure, the OpenStack controller node transmits a corresponding relationship between the port UUID and the port ID of the VM to the SDN controller. The SDN controller generates a flow table according to a forwarding rule applied on the port and issues the flow table to the virtual network apparatus according to the corresponding relationship. Thus, the forwarding control to the VM packets is realized.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

The invention claimed is:

1. A virtual machine packet controlling method, applicable for an OpenStack network, wherein the OpenStack network comprises an OpenStack controller node, an OpenStack compute node, and a virtual network system; the OpenStack network is communicatively connected with a software defined network (SDN) controller, the virtual network system comprises a virtual machine (VM), and a virtual network apparatus responsible for forwarding packets of the virtual machine; the method comprising:

creating, by the OpenStack controller node, a port for the virtual machine, and informing the SDN controller of a port universally unique identifier (UUID) of the port created for the VM and a forwarding rule applied on the port;

after the VM is created in the virtual network system, the OpenStack controller node receiving a port ID of the VM retrieved by the OpenStack compute node, wherein the port ID of the VM is allocated by the virtual network system according to a configured port group;

the OpenStack controller node transmitting a corresponding relationship between the port ID and the port UUID of the VM to the SDN controller, wherein the SDN controller generates a flow table according to the forwarding rule applied on the port, and issues the flow table to the virtual network apparatus according to the corresponding relationship.

2. The method of claim 1, wherein the OpenStack controller node transmitting the corresponding relationship between the port ID and the port UUID of the VM to the SDN controller comprises:
the OpenStack controller generating a port update message, wherein the port update message includes the port ID acting as a port name of the VM and the port UUID corresponding to the port ID;
the OpenStack controller node transmitting the port update message to the SDN controller.

3. The method of claim 1, further comprising:
before the OpenStack controller node creating the port for the VM, the OpenStack controller node transmitting a configured forwarding group and the forwarding rule to the SDN controller, wherein each forwarding group has a unique forwarding group identifier;
the informing the SDN controller of the port UUID created for the VM and the forwarding rule applied on the port comprises:
informing the SDN controller of the port UUID created for the VM and the forwarding group identifier of the forwarding group configured for the port of the VM.

4. The method of claim 3, wherein the forwarding group is a security group, the forwarding rule is a security group rule, and the forwarding group identifier is a security group identifier;
or, the forwarding group is a service chain, the forwarding rule is service chain information, and the forwarding group identifier is a service chain identifier.

5. A virtual machine packet controlling method, applicable for a software defined network (SDN) controller, wherein the SDN controller is communicatively connected with an OpenStack network, the OpenStack network comprises an OpenStack controller node, an OpenStack compute node and a virtual network system, the virtual network system comprises a virtual machine (VM), and a virtual network apparatus responsible for forwarding packets of the virtual machine; the method comprising:
after the OpenStack controller node creates a port for the VM, the SDN controller obtaining a port universally unique identifier (UUID) of the port created for the VM by the OpenStack controller node and a forwarding rule applied on the port;
the SDN controller receiving from the OpenStack controller and saving a corresponding relationship between an port ID and the port UUID of the VM, wherein the OpenStack controller node receives from the OpenStack compute node the port ID of the VM retrieved by the OpenStack compute node, the port ID of the VM is allocated by the virtual network system according to a configured port group;
the SDN controller generating a flow table according to the forwarding rule applied on the port, and issuing the flow table to the virtual network apparatus according to the corresponding relationship.

6. The method of claim 5, wherein the SDN controller receiving and saving the corresponding relationship between the port ID and the port UUID of the VM comprises:
the SDN controller receiving a port update message from the OpenStack controller node;
the SDN controller parsing the port update message and obtaining the port UUID and the port ID carried in a port name; and
the SDN controller saving the corresponding relationship between the port UUID and the port ID of the VM.

7. The method of claim 5, wherein before the SDN controller obtains the port UUID of the port created for the VM by the OpenStack controller node and the forwarding rule applied on the port, the method further comprises:
the SDN controller receiving a forwarding group and the forwarding rule from the OpenStack controller node; wherein each forwarding group has a unique forwarding group identifier;
the SDN controller obtaining the port UUID of the port created for the VM by the OpenStack controller and the forwarding rule applied on the port comprises:
the SDN controller receiving the port UUID of the VM from the OpenStack controller node and a forwarding group identifier of the forwarding group utilized by the port of the VM, creating a corresponding relationship between the port UUID of the VM and the forwarding group identifier of the forwarding group utilized by the port of the VM;
the SDN controller generating the flow table according to the forwarding rule applied on the port and issuing the flow table to the virtual network apparatus according to the corresponding relationship comprises:
the SDN controller determining the forwarding rule contained in the forwarding group applied on the port of the VM according to the forwarding group identifier;
the SDN controller generating the flow table according to the determined forwarding rule; and
the SDN controller issuing the flow table to the corresponding virtual network apparatus according to the corresponding relationship between the port ID and the port UUID of the VM.

8. A virtual machine packet controlling apparatus, applicable for an OpenStack controller node of an OpenStack network, wherein the OpenStack network comprises an OpenStack controller node, an OpenStack compute node and a virtual network system, the OpenStack controller node is communicatively connected with a software defined network (SDN) controller, the virtual network system comprises a virtual machine (VM), and a virtual network apparatus responsible for forwarding packets of the virtual machine, the apparatus comprising:
a port creation notifying module, to create a port for the VM, and inform the SDN controller of a port universally unique identifier (UUID) of the port created for the VM and a forwarding rule applied on the port; and
a port update notifying module, to receive, after the OpenStack controller node creates the VM in the virtual network system, a port ID of the port of the VM retrieved by the OpenStack compute node, wherein the port ID of the port of the VM is allocated by the virtual network system according to a configured port group; transmit the port ID of the port UUID to the SDN controller, wherein the SDN controller generates a flow table according to the forwarding rule applied on the port, and issues the flow table to the virtual network apparatus according to the corresponding relationship.

9. The apparatus of claim 8, wherein in order to transmit the corresponding relationship between the port ID and the port UUID to the SDN controller, the port update notifying module is further to:

generate a port update message, wherein the port update message comprises the port ID acting as a port name and the port UUID corresponding to the port ID; and transmit the port update message to the SDN controller.

10. The apparatus of claim 8, wherein the port creation notifying module is further to: before the port is created for the VM, transmit a configured forwarding group and the forwarding rule to the SDN controller, wherein each forwarding group has a unique forwarding group identifier;

in order to inform the SDN controller of the port UUID of the port created for the VM and the forwarding rule applied on the port of the VM, the port creation notifying module is further to:

inform the SDN controller of the port UUID of the port created for the VM and the forwarding group identifier of the forwarding group configured for the port of the VM.

11. A virtual machine packet controlling apparatus, applied in a software defined network (SDN) controller, wherein the SDN controller is communicatively connected with an OpenStack network, the OpenStack network comprises an OpenStack controller node, an OpenStack compute node and a virtual network system, the virtual network system comprises a virtual machine (VM) and a virtual network apparatus responsible for forwarding packets of the virtual machine; the apparatus comprising:

a port creation notification receiving module, to obtain, after the OpenStack controller node creates a port for the VM, a port universally unique identifier (UUID) of the port created for the VM by the OpenStack controller node and a forwarding rule applied on the port; and a flow table generating module, to receive from the OpenStack controller node and save a corresponding relationship between a port ID of the port of the VM and the port UUID of the VM, wherein the OpenStack controller node receives from the OpenStack compute node the port ID of the VM retrieved by the OpenStack compute node, the port ID of the VM is allocated by the virtual network system according to a configured port group; generate a flow table according to the forwarding rule applied on the port, and issue the flow table to the virtual network apparatus according to the corresponding relationship.

12. The apparatus of claim 11, wherein in order to receive and save the corresponding relationship between the port ID and the port UUID of the VM, the flow table generating module is further to:

receive a port update message from the OpenStack controller node;

parse the port update message, obtain the port UUID of the VM and the port ID of the VM carried in a port name; and save the corresponding relationship between the port UUID and the port ID of the VM.

13. The apparatus of claim 11, wherein the port creation notification receiving module is further to receive a forwarding group and the forwarding rule transmitted by the OpenStack controller node before obtaining the port UUID of the port created for the VM by the OpenStack controller node and the forwarding rule applied on the port, wherein each forwarding group has a unique forwarding group identifier;

in order to obtain the port UUID of the port created for the VM by the OpenStack controller node and the forwarding rule applied on the port, the port creation notification receiving module is further to:

receive the port UUID of the VM transmitted by the OpenStack controller node and the forwarding group identifier of the forwarding group utilized by the port of the VM, and establish a corresponding relationship between the port UUID of the VM and the forwarding group identifier of the forwarding group utilized by the port of the VM;

in order to generate the flow table according to the forwarding rule applied on the port and issue the flow table to the virtual network apparatus according to the corresponding relationship, the flow table generating module is further to:

determine the forwarding rule included in the forwarding group applied on the port of the VM according to the forwarding group identifier;

generate the flow table according to the determined forwarding rule; and issue the flow table to the corresponding virtual network apparatus according to the corresponding relationship between the port UUID and the port ID of the VM.

* * * * *